(12) United States Patent
Ayshford et al.

(10) Patent No.: US 8,052,770 B2
(45) Date of Patent: Nov. 8, 2011

(54) FILTER RETAINER FOR TURBINE ENGINE (75) Inventors: Gordon Ayshford, Hampshire (GB);
William Eyers, Hampshire (GB)

(73) Assignee: General Electric Company, Schenectady, NY (US)

( * ) Notice: Subject to any disclaimer, the term of this patent is extended or adjusted under 35 U.S.C. 154(b) by 462 days.

(21) Appl. No.: 12/404,068

(22) Filed: Mar. 13, 2009

(65) Prior Publication Data
US 2010/0229514 A1 Sep. 16, 2010

(51) Int. Cl.
*B01D 59/50* (2006.01)
(52) U.S. Cl. ............... 55/483; 55/484; 55/493; 55/495; 55/496; 55/501; 55/502; 55/507; 55/511; 55/490; 55/DIG. 31
(58) Field of Classification Search ............ 55/483, 55/484, 493, 495, 496, 501, 502, 507, 511, 55/490, DIG. 31
See application file for complete search history.

(56) References Cited

U.S. PATENT DOCUMENTS

| | | | | |
|---|---|---|---|---|
| 1,953,156 A | * | 4/1934 | Verner Dahlman | 55/502 |
| 3,093,401 A | * | 6/1963 | Hagendoorn | 292/207 |
| 3,993,464 A | * | 11/1976 | Pelabon | 55/480 |
| 4,217,122 A | | 8/1980 | Shuler | |
| 4,266,956 A | * | 5/1981 | Revell | 55/478 |
| 4,519,823 A | * | 5/1985 | Kinney et al. | 55/493 |
| 4,521,234 A | * | 6/1985 | Peebles et al. | 55/481 |
| 4,555,255 A | * | 11/1985 | Kissel | 55/355 |
| 4,600,419 A | * | 7/1986 | Mattison | 55/484 |
| 4,608,066 A | * | 8/1986 | Cadwell, Jr. | 55/385.1 |
| 4,632,681 A | * | 12/1986 | Brunner | 55/493 |
| 4,710,208 A | * | 12/1987 | Ziemer et al. | 55/355 |
| 4,808,203 A | * | 2/1989 | Sabourin | 55/492 |
| 4,860,420 A | * | 8/1989 | Cadwell et al. | 29/890.14 |
| 4,946,484 A | * | 8/1990 | Monson et al. | 55/385.2 |
| 4,978,375 A | * | 12/1990 | Il Yoo | 55/493 |
| 4,986,050 A | * | 1/1991 | Brunetti et al. | 52/506.08 |
| 5,279,632 A | * | 1/1994 | Decker et al. | 55/355 |
| 5,417,610 A | * | 5/1995 | Spransy | 454/187 |
| 5,454,756 A | * | 10/1995 | Ludwig | 454/296 |
| 5,458,772 A | * | 10/1995 | Eskes et al. | 210/238 |
| 5,512,074 A | * | 4/1996 | Hanni et al. | 55/484 |
| 5,514,197 A | * | 5/1996 | Den | 55/405 |
| 5,554,203 A | * | 9/1996 | Borkent et al. | 55/378 |
| 5,575,826 A | * | 11/1996 | Gillingham et al. | 55/284 |
| 5,637,124 A | * | 6/1997 | Diachuk | 55/342 |
| 5,788,729 A | * | 8/1998 | Jurgensmeyer | 55/496 |
| 5,797,975 A | * | 8/1998 | Davis | 55/493 |

(Continued)

FOREIGN PATENT DOCUMENTS

JP 11059861 3/1999

*Primary Examiner* — Jason M Greene
*Assistant Examiner* — Dung H Bui
(74) *Attorney, Agent, or Firm* — Fletcher Yoder (57) ABSTRACT

Embodiments of the present invention include a filter clamping device for use in a filtering system that provides filtered intake air for a power generation facility. In some embodiments, a filter clamp is provided, which includes an over-center action mechanism that locks the clamp in place against the filter gasket. Some embodiments also include a camming surface that provides gradually increasing pressure on the filter gasket as the clamp is engaged. The clamp may also include a stop that engages the filter frame at a predetermined position and determines, in part, the amount of clamping pressure applied to the filter.

23 Claims, 6 Drawing Sheets

U.S. PATENT DOCUMENTS

| | | | | |
|---|---|---|---|---|
| 5,871,556 A * | 2/1999 | Jeanseau et al. | | 55/385.2 |
| 6,099,612 A * | 8/2000 | Bartos | | 55/481 |
| 6,117,202 A * | 9/2000 | Wetzel | | 55/385.2 |
| 6,149,701 A * | 11/2000 | Ellingson | | 55/493 |
| 6,190,431 B1 * | 2/2001 | Jeanseau et al. | | 55/385.2 |
| 6,264,713 B1 * | 7/2001 | Lewis, II | | 55/481 |
| 6,267,793 B1 | 7/2001 | Gomez et al. | | |
| 6,270,546 B1 * | 8/2001 | Jeanseau et al. | | 55/385.2 |
| 6,293,983 B1 * | 9/2001 | More | | 55/486 |
| 6,351,920 B1 * | 3/2002 | Hopkins et al. | | 52/506.08 |
| 6,361,578 B1 * | 3/2002 | Rubinson | | 55/487 |
| 6,447,566 B1 * | 9/2002 | Rivera et al. | | 55/482 |
| 6,451,079 B1 * | 9/2002 | Lange et al. | | 55/379 |
| 6,485,538 B1 * | 11/2002 | Toyoshima | | 55/490 |
| 6,497,739 B2 * | 12/2002 | McGill | | 55/385.2 |
| 6,554,880 B1 * | 4/2003 | Northcutt | | 55/385.2 |
| 6,716,267 B2 * | 4/2004 | Lawlor, Sr. | | 55/506 |
| 6,858,055 B2 * | 2/2005 | McGill | | 55/385.2 |
| 7,128,771 B2 * | 10/2006 | Harden | | 55/385.2 |
| 7,261,757 B2 * | 8/2007 | Duffy | | 55/502 |
| 7,323,028 B2 * | 1/2008 | Simmons | | 55/495 |
| 7,332,012 B2 * | 2/2008 | O'Connor et al. | | 55/493 |
| 7,410,520 B2 * | 8/2008 | Nowak et al. | | 55/482 |
| 7,413,587 B2 * | 8/2008 | Beier | | 55/483 |
| 7,422,613 B2 * | 9/2008 | Bockle et al. | | 55/318 |
| 7,452,396 B2 * | 11/2008 | Terlson et al. | | 55/496 |
| 7,537,630 B2 * | 5/2009 | Schuld et al. | | 55/496 |
| 7,588,618 B2 * | 9/2009 | Osborne et al. | | 55/481 |
| 7,588,629 B2 * | 9/2009 | Osborne et al. | | 96/129 |
| 7,662,216 B1 * | 2/2010 | Terres et al. | | 95/273 |
| 7,670,401 B2 * | 3/2010 | Whittemore | | 55/480 |
| 7,686,869 B2 * | 3/2010 | Wiser et al. | | 96/66 |
| 7,776,122 B2 * | 8/2010 | Feldmann | | 55/481 |
| 7,901,476 B2 * | 3/2011 | Kao | | 55/379 |
| 7,901,479 B2 * | 3/2011 | Osborne et al. | | 55/481 |
| 7,972,401 B2 * | 7/2011 | Stock et al. | | 55/483 |
| 7,976,604 B2 * | 7/2011 | Desjardins | | 55/503 |
| 2002/0139098 A1 * | 10/2002 | Beier | | 55/495 |
| 2005/0204713 A1 * | 9/2005 | Wu et al. | | 55/496 |
| 2005/0279064 A1 * | 12/2005 | Simmons | | 55/495 |
| 2006/0168925 A1 * | 8/2006 | Whittemore | | 55/490 |
| 2007/0084168 A1 * | 4/2007 | Ashwood et al. | | 55/486 |
| 2007/0169448 A1 * | 7/2007 | Osborne et al. | | 55/484 |
| 2007/0199449 A1 * | 8/2007 | Wiser et al. | | 96/69 |
| 2007/0204576 A1 * | 9/2007 | Terlson et al. | | 55/496 |
| 2007/0220851 A1 * | 9/2007 | Parker et al. | | 55/484 |
| 2007/0220854 A1 * | 9/2007 | Feldmann | | 55/490 |
| 2009/0113862 A1 * | 5/2009 | Connor et al. | | 55/484 |
| 2009/0320426 A1 * | 12/2009 | Braunecker et al. | | 55/511 |
| 2010/0139225 A1 * | 6/2010 | Mammarella et al. | | 55/493 |
| 2010/0192528 A1 * | 8/2010 | Mann et al. | | 55/483 |
| 2010/0229514 A1 * | 9/2010 | Ayshford et al. | | 55/482 |
| 2010/0251678 A1 * | 10/2010 | Mann et al. | | 55/483 |
| 2010/0251681 A1 * | 10/2010 | Gebert | | 55/495 |

* cited by examiner

FILTER RETAINER FOR TURBINE ENGINE

BACKGROUND OF THE INVENTION

The subject matter disclosed herein relates to systems and devices for retaining a filter within a filter holding frame.

A gas turbine engine, e.g., in a power plant, intakes a large supply of air. A filter system typically filters dust, moisture, and other contaminants to protect the gas turbine engine and improve performance. The filter system may include an array of filters on a large filter frame in a filter house. The filters are removable to enable cleaning and replacement of the filters. Often, the filters are held in place by the intake air pressure, which may, in some cases, sufficiently press the filter against the filter frame to block air from leaking around the filter. However, the pressure alone may not be sufficient to retain and seal the filter against the filter frame. Unfortunately, the use of fasteners adds cost, complexity, and the potential for damage to the gas turbine engine. For example, the fastener may be loose or easily removable, such that the fastener can potentially disconnect and enter the air flow path into the gas turbine engine. The fastener also can inadvertently over-tighten the filter, and thus damage the filter or inhibit proper sealing.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a turbine engine configured to receive filtered air from a filter assembly that comprises a plurality of filters held in a filter holding frame. The frame includes a plurality of fasteners, each of which comprises an arm coupled to the filter holding frame at a first joint and one or more filter retention pads. The arm is configured to rotate about the first joint to move the retention pads between retained and released positions relative to one or more filters disposed in one or more filter cells.

In a second embodiment, a system includes a filter holding frame configured to support a plurality of filters for a turbine engine. The filter holding frame includes a first filter cell and a clamp comprising an over-center action mechanism. The clamp also includes a cam configured to progressively compress a first filter into the first filter cell during rotation of the clamp toward the first filter.

In a third embodiment, a system includes a filter holding frame configured to support a plurality of filters for a turbine engine. The filter holding frame includes a first filter cell that has a first sealing face and a clamp configured to press a first filter against the first sealing face. The clamp includes a resilient arm coupled to the filter holding frame at a first rotational joint, and a rigid arm coupled to the resilient arm at a second rotational joint offset from the first rotational joint. The resilient arm is configured to expand and contract between the first and second rotational joint. The rigid arm comprises a pin receptacle configured to engage a pin that defines a third rotational joint.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present invention include a filter clamp configured to clamp a filter in a filter system that provides intake air to large scale machinery, such as gas turbine engines, in a power generation facility. The filter clamp may include 2, 3, or more rotational axes, and may rotate between a withdrawn position away from the filter and a retracted position in close proximity to the filter. As discussed below, the withdrawn position of the filter clamp is configured to reduce interference or blockage of the filter during installation and removal. The retracted position of the filter clamp is configured to reduce the protrusion of the filter clamp when fully secured against the filter. In other words, the retracted position may entirely or substantially recess the filter clamp within the filter system. In certain embodiments, the filter clamp includes an over-center action mechanism and a camming mechanism. In particular, the camming mechanism may be used to slide the filter clamp along the filter gasket during rotation of the filter clamp across a center point or balance point, wherein the over-center action mechanism resists movement of the clamp toward the center point. Thus, upon crossing the center point, the over-center action mechanism resists rotation of the filter clamp back across the center point, thereby automatically retaining the filter clamp in position against the filter gasket. The camming mechanism may include a curved camming surface that provides gradually increasing pressure on the filter gasket as the clamp is rotated into position against the filter gasket. The clamp may also include a stop that engages the filter frame at a predetermined position and determines, in part, the amount of clamping pressure applied to the filter gasket. In this manner, the clamp limits the compression on the filter gasket for a more repeatable and reliable seal. The clamps described herein are small, inexpensive, easy to use, include no loose parts, and provide consistent, predetermined clamping force to a filter gasket.

Figure 1:
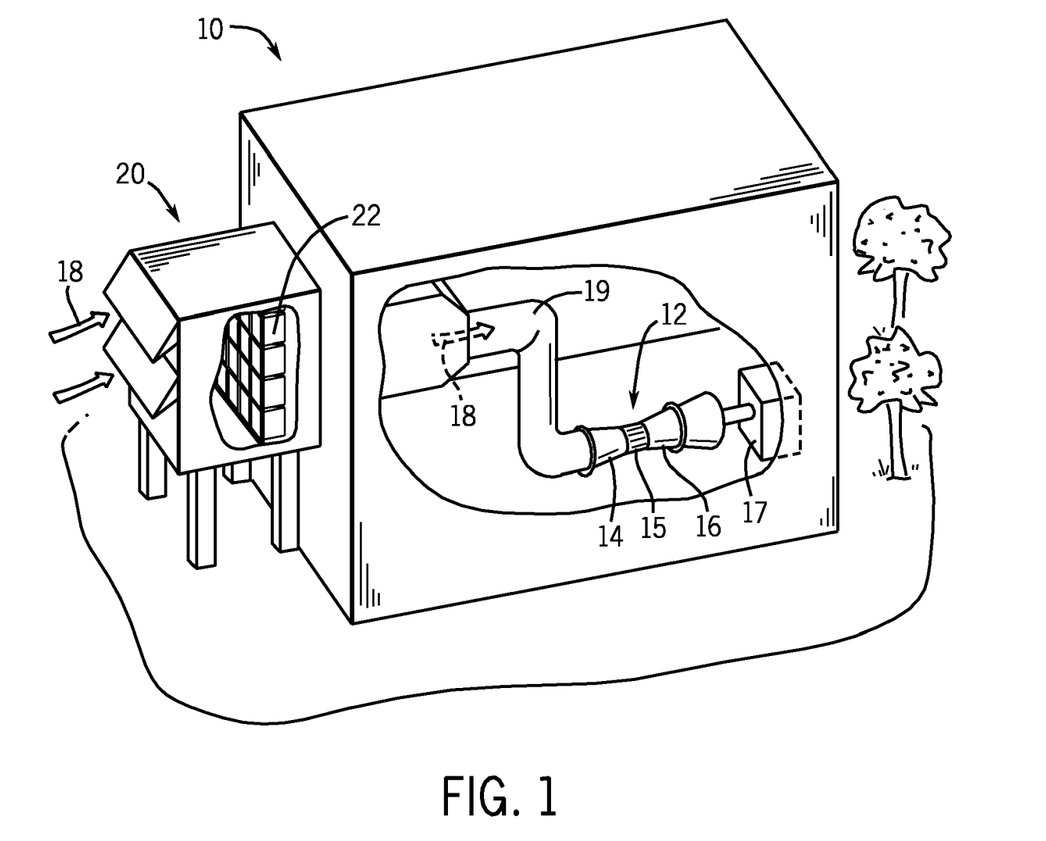
FIG. 1 is a perspective view of an embodiment of a power generation facility with a filter frame that uses the novel filter clamps disclosed herein.

FIG. 1 is a perspective view of an embodiment of a power generation facility 10 with a filter frame 22 that uses the novel filter clamps disclosed herein. The power generation facility 10 includes a gas turbine engine 12 that generates electrical power. In general, the turbine engine 12 includes an air compressor 14, one or more combustors 15 that receive and combust an air-fuel mixture of compressed air and fuel, and one or more turbines 16 driven by hot gases of combustion of the air-fuel mixture. Thus, the hot gases of combustion drive the turbines 16, which in turn drive the compressor 14 and one or more other loads. For example, in the illustrated embodiment, the turbine engine 12 may be coupled to a variety of loads, such as an electrical generator 17. The turbine engine 12 draws intake air 18 into the air compressor 14 from the outdoors through air ducts 19. As the intake air 18 enters the facility, it first passes through a filter house 20. Inside the filter house 20, an array of filters, held by one or more filter frames 22, filter the intake air 18 to remove contaminants such as dust, dirt, moisture, salt, carbon and any other contaminants that may tend to reduce the performance of the turbine engine 12. The filter house 20 may be several stories high, and may house up to several hundred filters, which may be held by several filter frames 22. As discussed in detail below, the filter frame 22 may include a set of filter clamps or latches with an over-center action mechanism and a camming mechanism.

Figure 2:
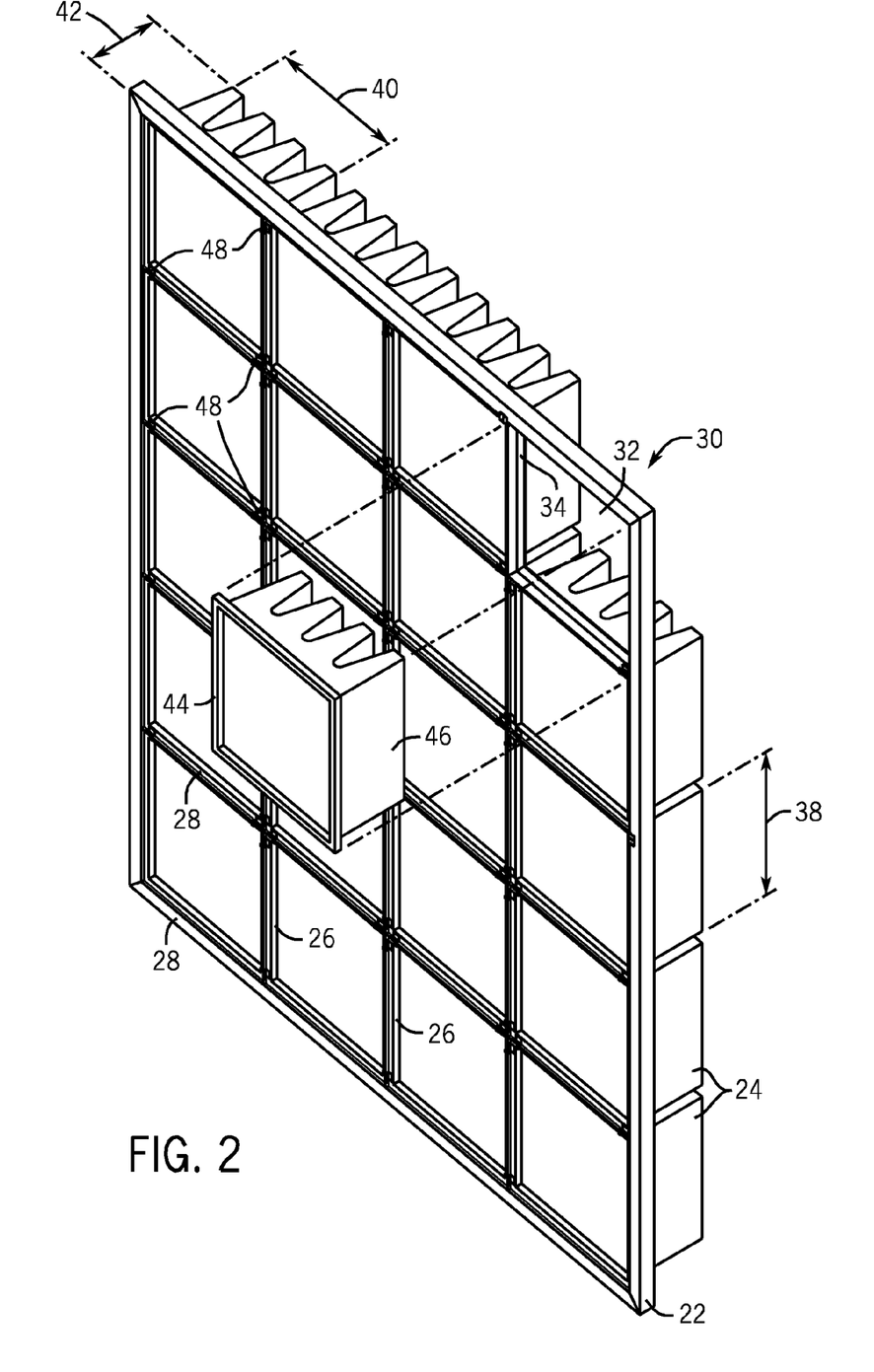
FIG. 2 is a perspective view of an embodiment of the filter frame of FIG. 1.

FIG. 2 is a perspective view illustrating an embodiment of the filter frame 22 of FIG. 1. As shown in FIG. 2, the filter frame 22 includes a set of vertical supports 26 and horizontal supports 28 that define filter cells 30, each of which holds a single air filter 24. The supports 26 and 28 may be described as panels, bars, beams, or framework of the filter frame 22. Together, the supports 26 and 28 define a skeletal structure of the filter frame 22. Each filter cell 30 includes an aperture 32 through which the filter 24 may pass and a sealing face 34 that blocks air from flowing around the filter 24. The filter 24 may include a filter body 46 that passes through the aperture 32 and a sealing gasket 44 that fits inside the filter cell 30 and is compressed against the sealing face 34. The filter height 38 and width 40 may be approximate 600 mm, the filter depth 42 may be approximately 400 to 500 millimeters, and each filter may weight approximately 15 kilograms. The filters 24 may be any suitable type, such as bag filters or mini-pleat filters. In some embodiments, the filters 24 may be high-efficiency AltairSupernova™ filters, available from General Electric. Additionally, in some embodiments, the filter cells 30 and the filters 24 disposed therein may be titled to provide suitable drainage for moisture which may collect on the outside of the filter 24. For example, the filter frame 22 may be tilted by an angle of less than or equal to approximately 5, 10, or 15 degrees relative to vertical.

Also included in the filter frame 22 are several filter latches or clamps 48 that hold the filters 24 in place by pressing the filter gasket 44 against the sealing face 34, applying a compressive force to the filter gasket 44, as will be explained further below. The total clamping force holding the filter gasket 44 against the sealing face 34 may be approximately 61 kilograms. Each filter 24 may be held in place by two or more filter clamps 48. In certain embodiments, each filter 24 is held by 2, 3, 4, 5, 6, 7, 8, 9, 10, or more clamps 48. The filter clamps 48 may be coupled to the vertical supports 26, the horizontal supports 28, or both. Additionally, some or all of the filter clamps 48 may compress at least two of the filters 24. As discussed in detail below, the filter clamps 48 may have an over-center action mechanism and a camming mechanism. In particular, the camming mechanism may be used to slide the filter clamp 48 along the filter gasket 44 of the filter 24 during rotation of the filter clamp 48 across a center point or balance point, wherein the over-center action mechanism resists movement of the clamp 48 toward the center point. Thus, upon crossing the center point, the over-center action mechanism resists rotation of the filter clamp 48 back across the center point, thereby automatically retaining the filter clamp 48 in position against the filter gasket 44.

Figure 3:
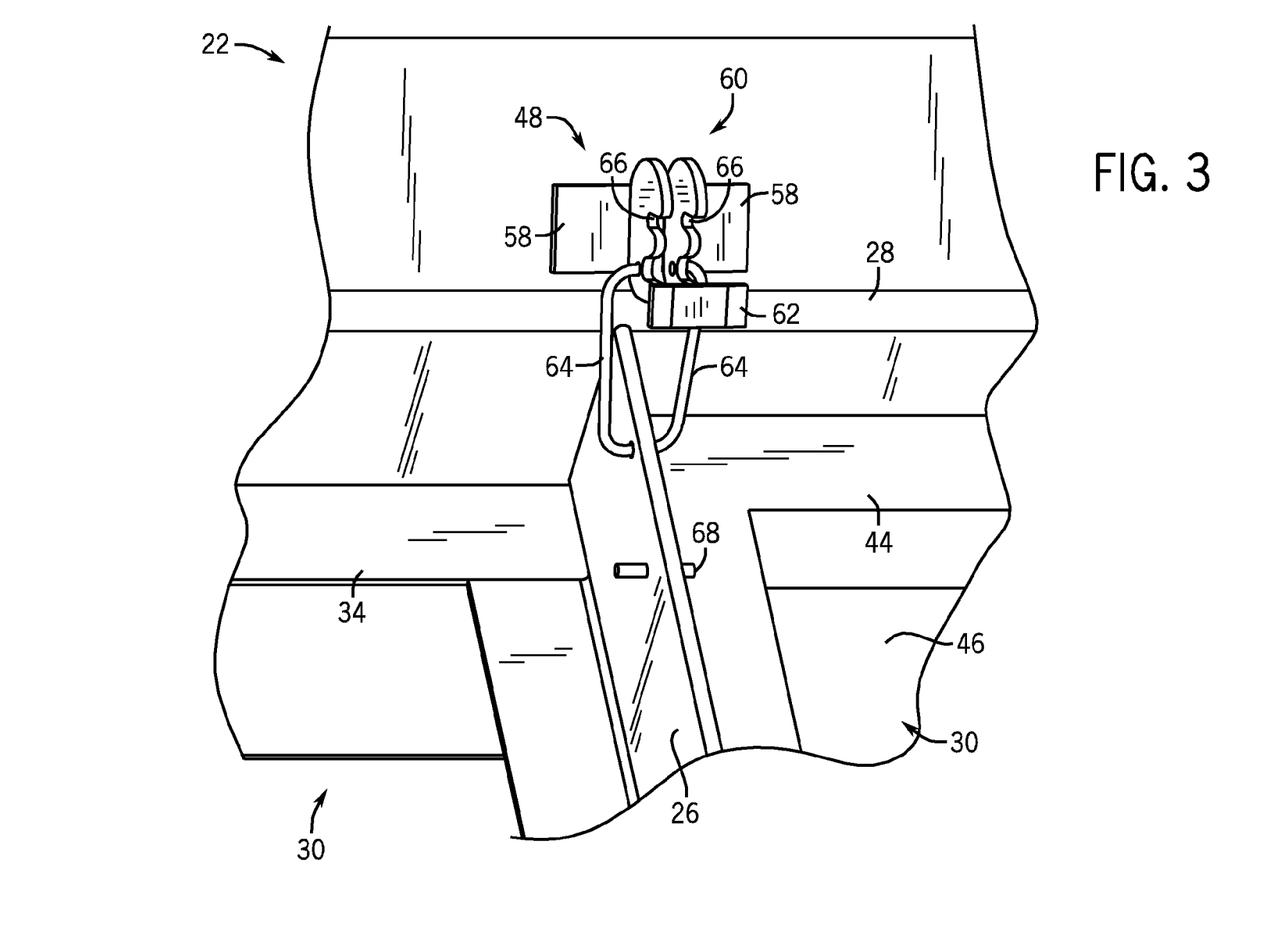
FIG. 3 is a perspective view of an embodiment of a filter clamp coupled to the filter frame of FIGS. 1 and 2.

FIG. 3 is a perspective view of an embodiment of a filter clamp 48 coupled to the filter frame 22 of FIGS. 1 and 2, wherein the filter clamp 48 is rotated to a withdrawn position away from the filter cells 30. The filter clamp 48 may include one or more filter retention pads 58 fixedly coupled to and supported by a rigid support arm 60. The rigid support arm 60 may include a stop 62 configured to provide a limit on the range of movement of the arm 60, and thus a limit on the compression of the filter gasket 44 of the filters 24, as discussed in detail below. The rigid support arm 60 may be coupled to the frame 22 via a resilient positioning arm 64, which enables the support arm 60 and the retention pads 58 to swing into or out of the clamped position. The rigid support arm 60 may include one or more slots 66 configured to engage a pin 68 coupled to the filter frame 22. The pin 68 protrudes perpendicularly from both sides of the vertical support 26 into two adjacent filter cells 30. The pin 68 may be welded or, in some other way, fixed to the frame 22. The slots 66 of the rigid support arm 60 may be configured to engage the pin 68 so that the support arm 60 and the filter pads 58 rotate about the pin 68 into or out of a clamped position. When the filter clamp 48 is engaged, the clamp 48 may straddle the vertical support 26 so that one retention pad 58 engages one filter 46, while the other retention pad 58 engages a filter 46 in an adjacent cell 30. Thus, the filter clamp 48 may be described as retracted or recessed against the filter frame 22 when fully engaged into a clamping position against the filter gaskets 44 of adjacent filters 24. In FIG. 3, the clamp 48 is shown in an outwardly swung or withdrawn position with the clamp 48 moved away from the filter cell 30 to allow removal or insertion of a filter 46 into the filter cell 30 without interference from the clamp 48. As will be explained further below, the filter clamp 48 may include an over-center action mechanism and a camming mechanism, both of which may be better understood with reference to FIGS. 4-6.

Figure 4:
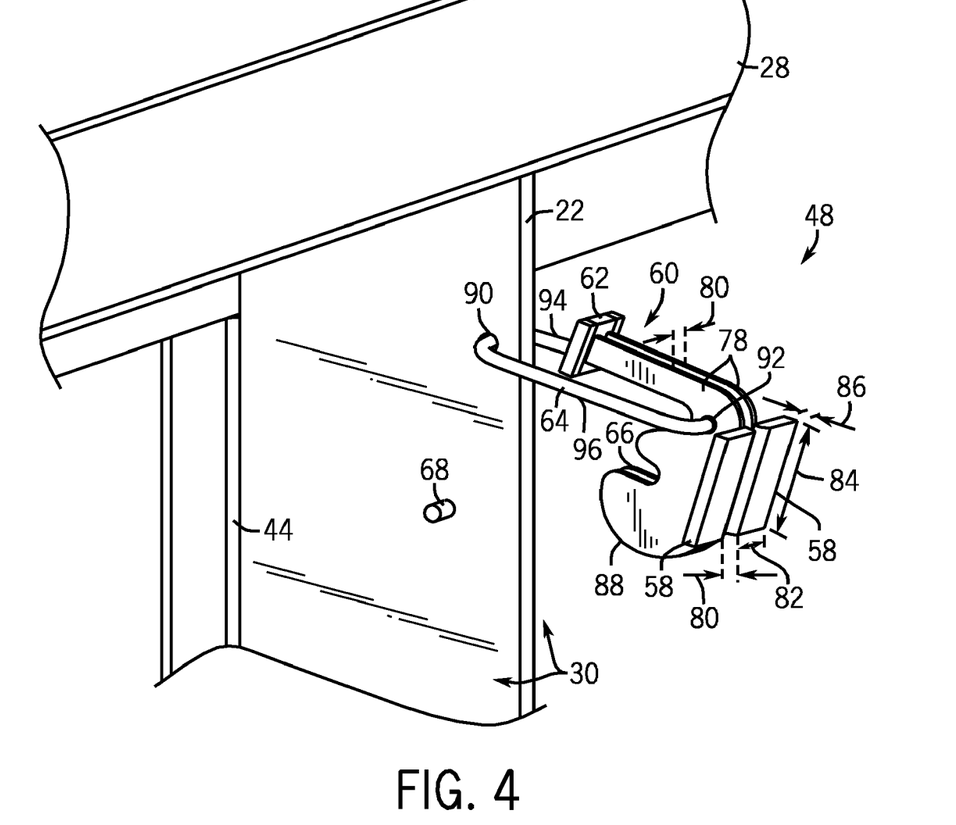
FIG. 4 is a close-up perspective view of an embodiment of the filter clamp shown in FIG. 3.

FIG. 4 is a close-up perspective view of an embodiment of the filter clamp 48 shown in FIG. 3. As mentioned above, the clamp 48 may include the rigid support arm 60 and the resilient positioning arm 64. As is more clearly shown in FIG. 4, the rigid support arm 60 may include a first rigid arm portion and a second rigid arm portion formed by two adjacent parallel plates 78. The plates 78 may be spaced apart (e.g., parallel) to form a gap 80 that enables the clamp 48 to straddle the filter frame 22. In some embodiments, the plates 78 may be identical in shape and stacked squarely so that substantially equal compressive force is applied to both of the filters 46 in the adjacent filter cells 30. Each of the plates 78 may be formed out of a thin rigid material, such as approximately 1/16 or 1/8 inch steel. The plates 78 may be coupled to one another via the stop 62, which may also serve as a grasping surface for operating the clamp 48. As will be discussed below in FIG. 6, the stop 62 may also serve to determine, in part, the amount of compressive force applied to the filter gasket 44.

As is also more clearly seen in FIG. 4, each of the two retention pads 58 may be coupled two one of the plates 78 and may extend perpendicularly outward from opposite sides of the support arm 60, maintaining the gap 80 between the first rigid arm portion and the second rigid arm portion. The retention pads 58 may be permanently coupled to the support arm 60 by any suitable fastener or coupling, such as a bolt, a screw, a weld, or a rivet. In some embodiments, the retention pads 58 may be extensions of the plates 78 (e.g., one-piece construction). For example, each plate 78 may be formed with an integral extension that is bent outward to a ninety degree angle to form the retention pad 58. A width 82 of the pads 58 may be approximately 1.5 inches, a length 84 of the pads 58 may be approximately 3 inches, and a thickness 86 of the pads 58 may be approximately 1/16 to 1/8 inch. The support arm 60 may also include a camming surface 88 for gradually increasing the compressive force exerted by the clamp 48 on the filter gasket 44 as the retention pads 58 are moved into the clamped position, as will be explained further below.

The positioning arm 64 couples the support arm 60 to the support panel (e.g., either vertical support 26 or horizontal support 28) of the frame 22 and allows the support arm 60 to swing into a clamped position or to swing out of the way during filter removal or insertion. The positioning arm 64 may include a first resilient arm portion 94 and a second resilient arm portion 96 that together form a U-shape, C-shape, or O-shape. The positioning arm 64 may be coupled to the frame 22 at a first rotatable joint 90. In some embodiments, the first rotatable joint 90 may be a through-hole formed in the frame 22, such that the u-shaped positioning arm 64 passes through to position the first resilient arm portion 94 on one side of the support 26 and the second resilient arm portion 96 on the other side of the support 26. In other embodiments, the first rotatable joint 90 may be formed by a through-hole formed by a clip mounted to the edge of the frame 22. The ends of the u-shaped positioning arm 64 may be coupled to the side plates 78 of the support arm 60 at second rotatable joints 92 located in the side plates 78 on opposite sides of the rigid support arm 60. The arrangement described above provides at least two degrees of freedom to the rigid support arm 60. Namely, the first rotatable joint 90 enables the support arm 60 to pivot about the first rotatable joint 90, and the second rotatable joint 92 enables the support arm 60 to rotate about the second rotatable joint 92. In some embodiments, the positioning arm 64 may be long enough to pivot the support arm 60 beyond the horizontal support 28 as shown in FIG. 3 so that the support arm 60 does not block either of the filter cells 30. It should also be noted that embodiments of the clamping mechanism describe herein include no loose parts, i.e., parts that are easily removable such as nuts or bolts.

As will be explained further below with reference to FIGS. 5 and 6, the over-center action of the clamp is enabled, in part, by the resiliency of the positioning arm 64. Therefore, the positioning arm 64 may be formed, at least in part, by spring steel, such as AISI 9255 or ASTM A228 steel, for example. The spring steel may have an ultimate tensile strength ranging between approximately 200,000 to 300,000 psi and a Rockwell C hardness of approximately 40 to 50.

Figure 5:
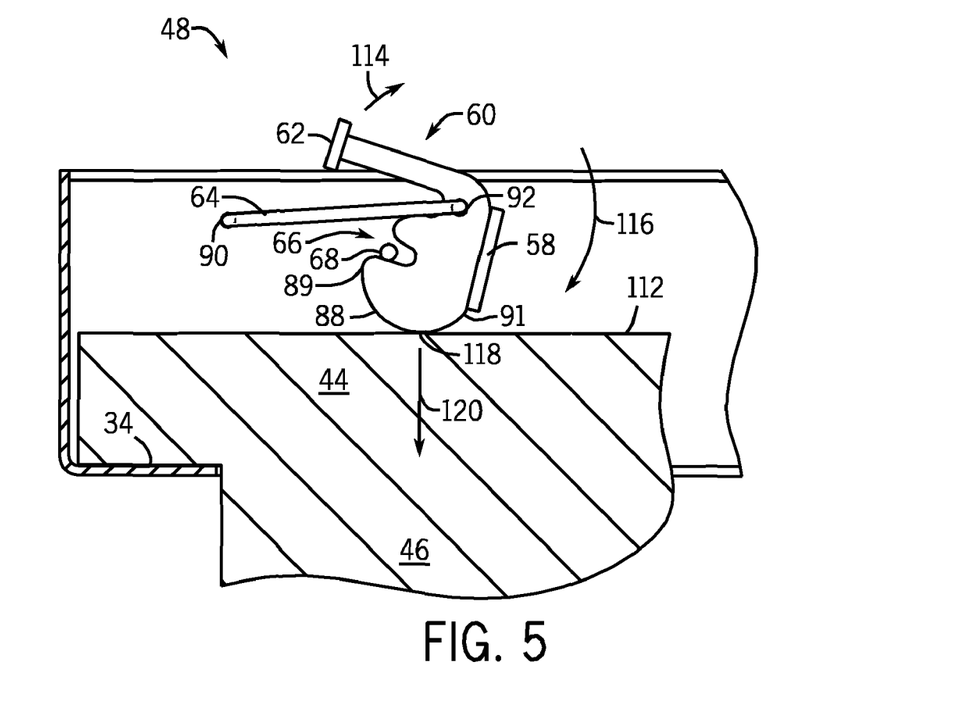
FIGS. 5 and 6 are side views of an embodiment of the filter clamp of FIGS. 3 and 4, illustrating two different stages of engagement of a clamping mechanism of the filter clamp of FIGS. 3 and 4.
Figure 6:
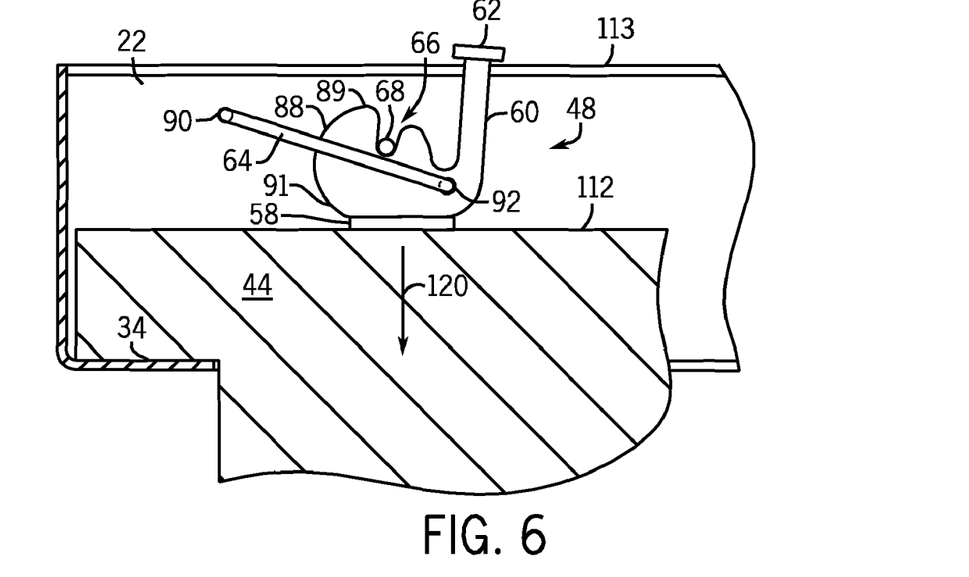

The clamping action of the clamp 48 may be better understood with reference to FIGS. 5 and 6, which are side views of the clamp, illustrating an embodiment of a clamping mechanism enabled by the clamp of FIGS. 3 and 4. FIGS. 5 and 6 show the clamp at two different stages of engagement, e.g., partially engaged and fully engaged stages. In particular, FIG. 5 shows the clamp 48 at a stage when the clamp 48 first makes contact with the filter gasket 44. With the clamp 48 positioned as shown in FIG. 5, the slots 66 on both sides of the clamp 48 engage the pin 68 and the pin 68 holds the camming surface 88 against the gasket 44 at a contact point 118. At this position, the positioning arm 64 may be in a resting state, e.g., the positioning arm 64 experiences little or no tension. From this position, subsequent clockwise rotation of the support arm 60 will simultaneously begin to engage the over-center action and the camming action of the clamp 48.

The over-center action of the clamp describes the characteristic of the clamp 60 wherein the clamp 48 will tend to resist being urged into a clamped position until the clamp 48 moves past a center point or balance point, after which the clamp 48 will tend to be urged into the clamped position. For example, when the stop 62 is pulled in a clockwise arc about the pin 68 as indicated by the arrow 114, the clamp 48 and the rotatable joint 92 rotate clockwise, as indicated by the arrow 116. As the clamp 48 and the rotatable joint 92 rotate clockwise, the distance between the first rotatable joint 90 and the second rotatable joint 92 increases, thus applying gradually increased tension to the resilient positioning arm 64, which stretches to allow the clamp 48 to rotate. During this initial phase of the rotation, the tension in the positioning arm 64 tends to resist the clockwise rotation of the support arm 60. However, the tension in the positioning arm 64 will eventually reach a high point when the first rotatable joint 90, the second rotatable joint 92, and the pin 68 are in line with one another as viewed from the side. This point of high tension may be referred to as the center point or balance point. After the support arm 60 rotates past the center point, the tension in the positioning arm 64 will tend to urge the support arm in the clockwise direction 116, toward the filter gasket 44 and the sealing face 34. As the clamp 48 continues to rotate beyond the center point, the distance between the first rotatable joint 90 and the second rotatable joint 92 decreases, thus releasing the tension in the positioning arm 64. In one embodiment, which will be described further below in relation to FIG. 8, the positioning arm 64 may also flex outward around the pin 68 when the first rotatable joint 90, second rotatable joint 92, and pin 68 are in line with one another. In other embodiments, the pin 68 may be short enough that the positioning arm 64 moves past the pin 68 without contacting the pin 68.

Meanwhile, as the clamp 48 is moved in to a clamped position, the camming action of the clamp 48 is also engaged. The camming action describes the characteristic of the clamp 48 provided by the camming surface 88 wherein the compression of the filter gasket 44 against the sealing face 34 increases gradually as the clamp 48 is moved into the clamped position. To provide the camming action, the support arm 60 is shaped such that the distance between the bottom of the slot 66 and the camming surface 88 gradually increases from a forward end 89 toward a rearward end 91 adjacent the pads 58. Therefore, as the clamp 48 is rotated clockwise 116 and the contact point 118 moves along the camming surface 88 closer to the pads 58, the distance between the pin 68 and the contact point 118 gradually increases. The camming action, thus gradually increasing the downward pressure applied to the gasket 44.

Turning now to FIG. 6, the clamp 48 is shown in a fully clamped position, wherein the clamp 48 is substantially or entirely retracted relative to the filter frame 22. In particular, the plates 78, retaining pads 48, and positioning arm 64 are all positioned below a top edge 113 of the filter frame 22, whereas only the stop 62 remains above the top edge 113. Thus, in the fully clamped position, the filter frame 48 is generally recessed, rather than protruding, relative to the top edge 113 of the filter frame 22. As appreciated, the retracted position of the clamp 48 is advantageous over designs that that maintain a substantially protrusive portion, e.g., a fixed bolt or stud, because the retracted position reduces the possibility of blocking a walkway, snagging something, or the like.

With the clamp 48 positioned as shown in FIG. 6, the bottom surface of the retaining pads 58 are flat against the top sealing surface 112 of the gasket 44 and are applying downward pressure on the gasket 44, thereby holding the gasket 44 against the sealing face 34 with sufficient force to block air leakage between the gasket 44 and the sealing face 34. At least part of the downward pressure exerted on the gasket 44 may be provided by the tension in the positioning arm 64, which may be prevented from returning to a resting state. In other words, the remaining tension in the positioning arm 64 pulls or holds the clamp 48 in the fully clamped position. As discussed above, the over-center action mechanism resists movement of the clamp 48 toward the center point, and thus after crossing the center point, it biases the clamp 48 toward the fully clamped position against the filter gasket 44.

In some embodiments, the downward pressure on the gasket 44 may also be exerted, at least in part, by the pin 68. As such, the pin 68 may maintain contact with the edge of the slot 66 when the clamp 48 reaches the fully clamped position. Accordingly, the clamp 48 may be sandwiched between the pin 68 and the sealing surface 112 of the gasket 44 when fully clamped, thereby holding the gasket 44 against the sealing face 34 and contributing to the compressive force exerted on the gasket 44. In other embodiments, the tension in the positioning arm 64 may be sufficient to pull the clamp 48 down so that the pin 64 no longer contacts the bottom of the slot 66 when the clamp 48 reaches the fully clamped position. In this embodiment, the pin 68 no longer contributes to the compression of the gasket 44 once the clamp 48 is fully clamped. Rather, the compressive force is provided by the tension in the positioning arm 64 alone. In this embodiment, the clamp 48 may reach the fully clamped position when the resiliency of the compressed gasket 44 is balanced by the resiliency of the positioning arm 64. As noted above, the clamp 48 may include the stop 62 to limit the compressive force applied to the gasket 44 by the positioning arm 64. As such, the clamp 48 may reach the fully clamped position when the stop 62 comes in contact with a top edge 113 of the frame 22, as shown in FIG. 6.

Figure 7:
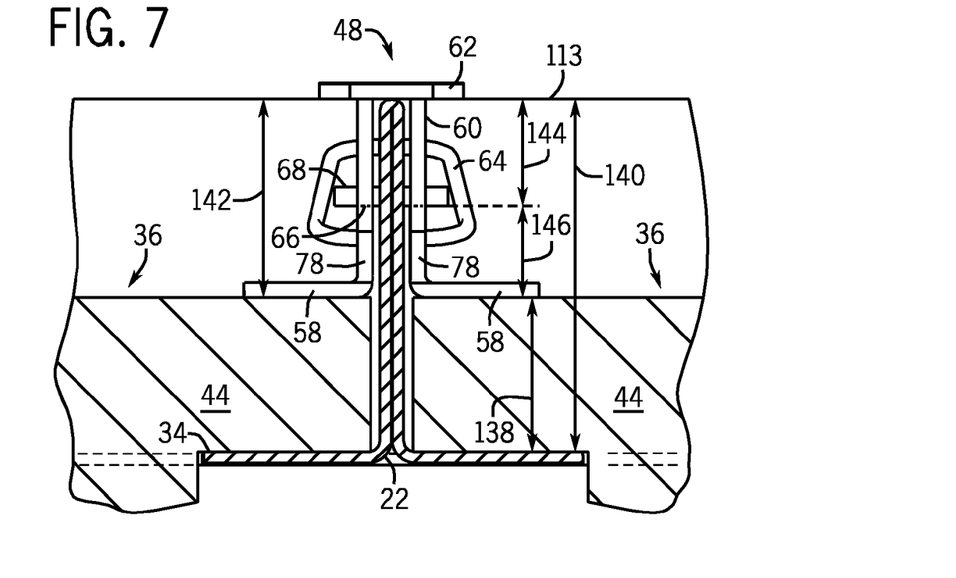
FIG. 7 is an end view of an embodiment of the filter clamp in a fully clamped position as in FIG. 6.

FIG. 7 is an end view of the clamp 48 in a fully clamped position as in FIG. 6. From this perspective, it can be more easily seen that the clamp 48 straddles the frame 22 so that the two filter gaskets 44 in adjacent filter cells 36 are compressed by the clamp 48. In the embodiment shown, which includes a stop 62, the compressive force applied to the gasket 44 may be determined by a dimension 138 (e.g., from the bottom surface of the pads 58 to the sealing face 34.) Distance 138 is, in turn, determined by subtracting distance 142 (e.g., from the bottom of the stop 62 to the bottom of the pads 58) from the distance 140 (e.g., from the top edge 113 of the frame to the sealing face 34). Furthermore, in embodiments wherein the pin 68 also contributes to the compression of the gasket 44, distance 146 (e.g., from the bottom of the slot 66 to the bottom surface of the pad 58) and distance 144 (e.g., from the top edge 113 of the frame 22 to the bottom of the pin 68) will be selected to ensure proper engagement of the clamp 48. Specifically, distance 144 and distance 146 may be selected so that the sum of distance 144 and distance 146 will equal distance 142. In certain embodiments, the dimensions or distances may be selected to enable at least approximately 5, 10, 15, 20, 25, 30, 35, 40, 45, 50 percent, or greater compression of the filter gasket 44

Figure 8:
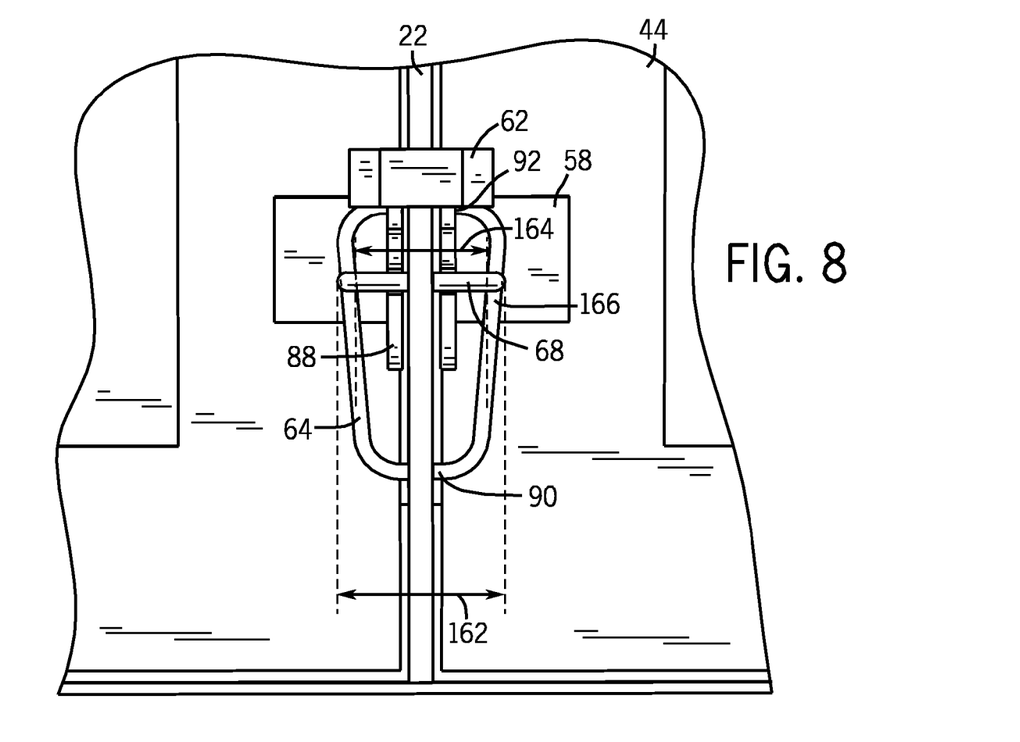
FIG. 8 is a top view of an embodiment of the filter clamp in a fully clamped position as shown in FIGS. 6 and 7, illustrating an embodiment of a second locking mechanism.

FIG. 8 is a top view of the clamp 48 in a fully clamped position as in FIGS. 6 and 7, illustrating an embodiment of a clamp 48 with a second retaining mechanism. In some embodiments, as shown in FIG. 8, a length 162 of the pin 68 in the vicinity of positioning arm 64 is slightly longer than a length 164 between the inside surfaces of the positioning arm 64. As such, opposite portions 166 of the positioning arm 64 may flex outward around the pin 68 to allow the positioning arm 64 to pass beyond the pin 68 as described above in relation to FIG. 5. In other words, the positioning arm 64 may bow outward around the pin 68 at the point in the rotation of the clamp 48 where the first rotatable joint 90, second rotatable joint 92, and pin 68 are in line with one another, as viewed from the side (see FIG. 5 and accompanying description.) The outward bowing of the positioning arm 64 thereby provides resistance to the clamping of the clamp 48. When the clamp 48 is later disengaged, e.g., rotated out of the clamping position, the bowing of the positioning arm 64 around the pin 68 again provides additional resistance to the unclamping of the clamp 48. In this way, the pin 64 may act as a second retainer, barrier, or locking pin for the clamp, thereby decreasing the likelihood of accidentally unclamping the clamp 48.

The filter clamping system and method described herein provides several advantages. For example, the clamp 48 itself is small, simple, easy to fabricate, and therefore inexpensive. Additionally, unlike other filter retention devices, the clamping system herein does not use any loose or easily detachable parts, thereby reducing the possibility that a part could become free and damage the turbine. Furthermore, the clamping pressure applied to the filter gasket 44 is reliable and repeatable and does not depend on the skill of the installer, because the force applied by the clamp 48 depends on the dimensions of the clamp 48 itself. For example, the stop 62 limits the range of motion of the clamp 48, thereby limiting the compression of the filter gasket 44. Moreover, the filter clamp 48 described herein uses no additional tools and is faster and simpler to operate than other filter retention devices such as those that use bolted connections. The faster, simpler operation of the clamp 48 makes the overall filter 24 removal and installation process much faster, particularly when repeated for the dozens or even hundreds of filters in a filter house. Furthermore, the clamp 48 does not substantially protrude from the filter frame 22 in a clamped position, as the entire clamp 48 retracts toward the filter frame 22 and filter 24.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
   a filter assembly, comprising:
   a plurality of filters;
   a filter holding frame, comprising:
   a plurality of filter cells; and
   a plurality of fasteners, wherein each fastener comprises:
   an arm coupled to the filter holding frame at a first joint, wherein the arm rotates about the first joint to move first and second retention pads between retained and released positions relative to first and second filters disposed in first and second filter cells, respectively; and
   a turbine engine configured to receive filtered air from the filter assembly.

2. The system of claim 1, wherein the arm comprises a first arm portion coupled to the filter holding frame at the first joint and a second arm portion coupled to the first arm portion at a second joint.

3. The system of claim 2, wherein the first arm portion comprises a first resilient arm portion and a second resilient arm portion disposed on opposite sides of a panel disposed between the first and second filter cells.

4. The system of claim 3, wherein the first and second resilient arm portions are coupled together at the first joint, and the first and second resilient arm portions collectively have a U-shaped geometry.

5. The system of claim 4, wherein the second arm portion comprises a first rigid arm portion and a second rigid arm portion, the first and second retention pads are coupled to first and second rigid arm portions, and the first and second rigid arm portions comprise first and second pin slots configured to receive first and second pins disposed in opposite sides of the panel.

6. The system of claim 5, wherein the first and second rigid arm portions are configured to rotate about the first and second pins while the second arm rotates relative to the first arm about the second joint.

7. The system of claim 2, wherein the second arm portion comprises a cam surface adjacent the first and second retentions pads, and the cam surface is configured to gradually compress the first and second filters during rotation of the first and second arm portions toward the first and second filters.

8. The system of claim 1, wherein the arm comprises an over-center action mechanism.

9. The system of claim 2, comprising a pin coupled to the filter holding frame and configured to engage the second arm, wherein the second arm is configured to rotate about the pin, and wherein the pin and second arm are configured to produce tension in the first arm when the second arm rotates about the pin.

10. The system of claim 9, wherein the pin and second arm are configured to increase the tension in the first arm until the second arm reaches a balance point in the rotation.

11. The system of claim 1, comprising a stopper coupled to the arm and configured to engage the filter holding frame and stop the rotation of the arm when the first and second retention pads are in the retained position.

12. A system, comprising:
a filter holding frame configured to support a plurality of filters for a turbine engine, wherein the filter holding frame comprises:
a first filter cell;
a clamp comprising a over-center action mechanism having a cam, wherein the cam is configured to progressively compress a first filter into the first filter cell during rotation of the clamp toward the first filter, wherein the clamp is coupled to the filter holding frame at a first rotational axis, the clamp comprises a rigid arm coupled to a resilient arm at a second rotational axis, and the rigid arm is configured to change a distance between the first rotational axis and the second rotational axis while rotating about a third rotational axis.

13. The system of claim 12, wherein the cam is configured to progressively compress a second filter into a second filter cell while simultaneously progressively compressing the first filter into the first filter cell during rotation of the clamp toward the first and second filters.

14. The system of claim 12, wherein the clamp is configured to secure at least two filters in two respective filter cells, and the clamp is configured to straddle a divider between the two respective filter cells.

15. The system of claim 12, wherein the resilient arm is coupled to the filter holding frame at the first rotational axis.

16. The system of claim 12, wherein the clamp comprises a stop configured to abut the filter holding frame to stop the rotation of the clamp toward the first filter at a predetermined orientation.

17. A system, comprising:
a filter holding frame configured to support a plurality of filters for a turbine engine, wherein the filter holding frame comprises:
a first filter cell comprising a first sealing face;
a clamp configured to press a first filter against the first sealing face, wherein the clamp comprises:
a resilient arm coupled to the filter holding frame at a first rotational joint;
a rigid arm coupled to the resilient arm at a second rotational joint offset from the first rotational joint, wherein the resilient arm is configured to expand and contract between the first and second rotational joint, and the rigid arm comprises a pin receptacle configured to engage a pin that defines a third rotational joint.

18. The system of claim 17, wherein the first, second, and third rotational joints are configured to provide an over-center action, wherein the expansion or contraction of the resilient arm creates tension in the resilient arm that reaches a high point when the first, second, and third rotational joints are aligned with one another.

19. The system of claim 18, wherein the clamp is configured to exert a compressive force on the first filter at least in part by the tension in the resilient arm.

20. The system of claim 19, wherein the clamp comprises a stop configured to limit a compressive force exerted on the first filter to a predetermined level.

21. A system, comprising:
a filter holding frame configured to support a plurality of filters for a turbine engine, wherein the filter holding frame comprises:
a first filter cell;
a clamp comprising a over-center action mechanism having a cam, wherein the cam is configured to progressively compress a first filter into the first filter cell during rotation of the clamp toward the first filter, and the cam is configured to progressively compress a second filter into a second filter cell while simultaneously progressively compressing the first filter into the first filter cell during rotation of the clamp toward the first and second filters.

22. A system, comprising:
a filter holding frame configured to support a plurality of filters for a turbine engine, wherein the filter holding frame comprises:
a first filter cell;
a clamp comprising a over-center action mechanism having a cam, wherein the cam is configured to progressively compress a first filter into the first filter cell during rotation of the clamp toward the first filter, and the clamp is configured to straddle a divider between the two respective filter cells.

23. The system of claim 22, wherein the clamp is configured to secure at least two filters in two respective filter cells.

* * * * *